Patented Aug. 20, 1940

2,212,363

UNITED STATES PATENT OFFICE 2,212,363

PROCESS OF PREPARING COMPOUNDS HAVING THE CHARACTER OF THE MALE SEXUAL HORMONES

Max Bockmühl, Gustav Ehrhart, Heinrich Ruschig, and Walter Aumüller, Frankfort-on-the-Main-Hochst, Germany, assignors to Winthrop Chemical Company, Inc., New York, N. Y., a corporation of New York No Drawing. Application August 9, 1938, Serial No. 223,856. In Germany August 12, 1937

6 Claims. (Cl. 260—397)

The present invention relates to a process of preparing compounds having the character of the male sexual hormones.

Compounds having the character of the male sexual hormones belonging to the cyclopentano-polyhydro-phenanthrene derivatives have hitherto been made by the oxidation of cholesterol and analogous substances. The characteristic feature of this reaction consists in splitting off the side-chain situated at the cyclopentane ring. As in this case most of the parent material is transformed into by-products, the yields of the desired final products are very small.

Now we have found a new process of preparing the compounds above referred to. It consists in subjecting to transformation by the Beckmann method the cyclopentano-polyhydro-phenanthrene compounds which have a

group at the five-membered ring. As is known, the oximes of these ketones are treated with transforming agents, such as PCl$_5$, SOCl$_2$, H$_2$SO$_4$, and others. Since the transformation occurs very readily, the amines can be obtained in a high yield and purity.

The amines obtainable according to the invention may be transformed into the corresponding ketones by oxidation by known methods, for instance by way of the alcohols.

The process generally allows the transformation of oximes of the following general formula

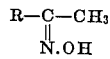

wherein R stands for a cyclopentano-polyhydro-phenanthrene residue, into amines of the following general formula, R—NH$_2$, wherein R stands for a saturated or unsaturated cyclopentano-polyhydro-phenanthrene residue.

The compounds bearing in 3-position of the cyclopentano-polyhydro-phenanthrene residue an esterified hydroxyl group are of a special importance.

The following examples serve to illustrate the invention but they are not intended to limit it thereto:

(1) (a) 1.3 grams of acetyl-pregnenolone-oxime (decomposition point at about 197° C.) are mixed in 10 cc. of benzene with 3.2 grams of thionyl chloride. During this operation a violent reaction sets in and the color of the solution changes to red. The solution is heated for 2 hours in a reflux apparatus, concentrated under reduced pressure and the residue is heated for 18 hours in 135 cc. of alcohol of 96 per cent strength together with 30 cc. of semi-concentrated hydrochloric acid. The whole is then concentrated again and extracted with ether after the addition of water. The aqueous solution contains the hydrochloride of 3-hydroxy-17-amino-androstene; after the addition of caustic soda solution the amine separates in the form of flakes. The mixture is extracted with ether and the ethereal solution is dried. The amine may be recrystallized from petroleum ether. It melts at 164° C. to 166.5° C. (not corrected). From an ethereal solution it can be precipitated in the form of acetate which decomposes at 227.5° C.

(b) 3.9 grams of acetyl-pregnenolone-oxime are treated for 2 hours in 30 cc. of benzene with 9.6 grams of thionyl chloride and the residue of the solution is hydrolized for 18 hours as described above with 405 cc. of alcohol of 96 per cent strength and 90 cc. of semi-concentrated hydrochloric acid. The yield of 3-hydroxy-17-amino-Δ-5.6-androstene-acetate amounts to 1.25 grams.

(c) 6 grams of acetyl-pregnenolone-oxime are treated with 14.5 grams of thionyl chloride in 45 cc. of benzene and the residue of the solution is hydrolyzed in 610 cc. of alcohol of 96 per cent strength by means of 134 cc. of semi-concentrated hydrochloric acid. The yield of 3-hydroxy-17-amino-Δ-5.6-androstene-acetate amounts to 1.92 grams.

A solution of 1.2 grams of sodium nitrite in 15 cc. of water is run into a solution of 700 milligrams of 3-hydroxy-17-amino-Δ-5.6-androstene in 15 cc. of alcohol; 6 cc. of 2 n-acetic acid are added, the whole is gradually heated to boiling on the steam bath and boiled for 10 minutes. The mixture is then poured in water and the whole is extracted with ether; the residue of the ethereal solution is distilled under a highly reduced pressure. The temperature during the distillation is 150° C. to 200° C. under a pressure of 0.02 millimeter. The product of the distillation which contains the Δ-5.6-androstendiol is recrystallized from acetone. The product melts at 177° C.

A solution of 0.32 gram of bromine in 10 cc. of glacial acetic acid is introduced drop by drop into 0.58 gram of androstendiol in 20 cc. of glacial acetic acid. 0.4 gram of chromic acid in 10 cc. of glacial acetic acid of 90 per cent strength is added. The solution is allowed to stand for 24 hours at room temperature and then poured into water. The precipitate of flakes is filtered with suction, taken up in ether and the ethereal solution is well washed and dried. The residue of the ethereal solution is heated for 40 minutes in 20 cc. of methanol with 1 gram of zinc dust, the solution is then filtered from the zinc dust and carefully sprayed with water, during which operation the Δ-5.6-androstendione is precipitated. It is taken up in 20 cc. of alcohol and after the addition of ½ cc. of 2 N-sulphuric acid the solution is kept gently boiling for 10 minutes. Water is sprayed thereon and the crystallized Δ-4.5-androstendione is purified by recrystallizing it from aqueous acetone until the constant melting point of 168° C. to 169° C. is attained.

(2) 3.1 grams of the oxime of 3-acetyl-pregnanolone in the form of needles melting at 113° C. are heated to boiling for 3 hours in a reflux apparatus together with 50 cc. of benzene and 10 grams of thionyl chloride. After distillation the residue is dissolved in 30 cc. of benzene and 250 cc. of ethanol of 96 per cent strength and after the addition of 31 cc. of concentrated hydrochloric acid and 31 cc. of water the solution is boiled for 18 hours in a reflux apparatus. The solution is then concentrated, poured into dilute caustic soda solution and extracted with ether. After having been washed the ethereal solution has an alkaline reaction. The ether solution is dried with sodium sulfate and concentrated. On carefully neutralizing it with ethereal solution of glacial acetic acid the amine acetate crystallizes and can be filtered with suction. The amine acetate becomes sticky in contact with air and readily dissolves in water. It is dissolved in methanol, a small quantity of sodium carbonate solution and water are added after turbidity has set in, the free amine soon crystallizes in the form of long slender needles. By boiling the substances with a small quantity of animal charcoal and recrystallizing it from methanol it is obtained in a pure condition. It melts at 174° C. By the reaction with nitrite and the oxidation as described in Example 1 the androstanedione is obtained.

We claim:

1. The process of preparing compounds having the character of male sexual hormones, the steps which comprise subjecting an oxime of the following general formula

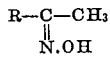

wherein R stands for a cyclopentano-polyhydrophenanthrene residue, to transposition by the Beckmann method and treating the amines thus obtained with an oxidizing agent.

2. The process of preparing compounds having the character of male sexual hormones, the steps which comprise subjecting an oxime of the following general formula

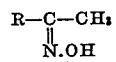

wherein R stands for a cyclopentano-polyhydrophenanthrene residue, to the action of a compound selected from the group consisting of phosphorus pentachloride, thionylchloride and sulfuric acid and treating the amines thus obtained with an oxidizing agent.

3. The process of preparing compounds having the character of male sexual hormones, the steps which comprise subjecting an oxime of the following general formula

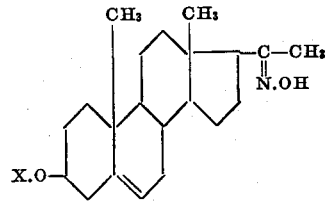

wherein X stands for an esterified hydroxyl group, to transposition by the Beckmann method and treating the amines thus obtained with an oxidizing agent.

4. The process of preparing compounds having the character of male sexual hormones, the steps which comprise subjecting an oxime of the following formula

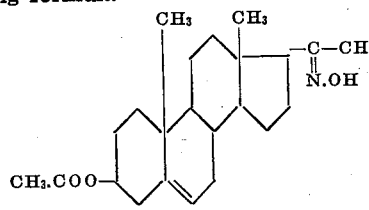

to transposition by the Beckmann method and treating the amines thus obtained with an oxidizing agent.

5. The process of preparing compounds having the character of male sexual hormones, the steps which comprise subjecting an oxime of the following general formula

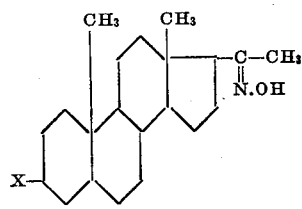

wherein X stands for an esterified hydroxyl group, to transposition by the Beckmann method and treating the amines thus obtained with an oxidizing agent.

6. The process of preparing compounds having the character of male sexual hormones, the steps which comprise subjecting an oxime of the following formula

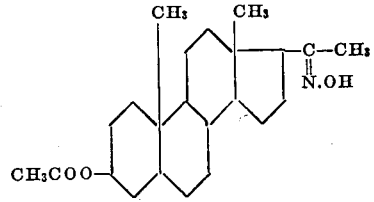

to transposition by the Beckmann method and treating the amines thus obtained with an oxidizing agent.

MAX BOCKMÜHL.
GUSTAV EHRHART.
HEINRICH RUSCHIG.
WALTER AUMÜLLER.